April 6, 1926.

A. BECKER ET AL 1,579,998

ROLLER MILL

Filed June 21, 1924

Inventors:
August Becker
and Oskar Stark

Patented Apr. 6, 1926.

1,579,998

UNITED STATES PATENT OFFICE.

AUGUST BECKER AND OSKAR STARK, OF BUDAPEST, HUNGARY, ASSIGNORS TO GANZ & CO.,-DANUBIUS MACHINE-, RAILWAY-CARRIAGE MANUFACTURING AND SHIPBUILDING CO. LTD., OF BUDAPEST, X., HUNGARY.

ROLLER MILL.

Application filed June 21, 1924. Serial No. 721,596.

*To all whom it may concern:*

Be it known that we, August Becker and Oskar Stark, citizens of Hungary, residing at Budapest, Hungary, have invented certain new and useful Improvements in Roller Mills, of which the following is a specification.

In roller mills the respective distance of the rollers must be regulated and must be also automatically adjustable in order to allow the passage of hard pieces which would injure the rollers. For this purpose one only of the rollers is journalled in the frame of the mill while the bearings of the other roller are arranged on rocking levers pivoted in the frame. The said arrangement has the drawback that the deformation resulting from the bending stress caused by the milling pressure injures substantially the high grade of precision of the parallel adjustment required for the rollers. The complete avoidance of this drawback would require excessively large bearings. The machining of such bearings with the required precision of parallelism causes on the one hand substantial difficulties, while on the other hand the excessive dimensions of the bearings increase the friction caused by the bearings and interfere with the sensitiveness of the adjustment.

One object of the invention is to avoid the said drawbacks and to allow a substantial reduction of the dimensions of the frame of the roller mill.

Another object is to simplify the machining of the frame and of the bearing parts of the roller.

Another object is to ensure an exact and sensitive parallel adjustment of the rollers.

Other objects will in part be pointed out hereinafter and in part will be obvious from the following description.

The above objects are attained chiefly by arranging the bearing members comprising the journals of the fixed roller on separate parts secured detachably on to the frame, while the rocking levers of the yielding roller and preferably also the draw members pressing the rollers towards each other are pivoted on the said bearing member.

The separate bearing member secured detachably to the frame is preferably connected at one side of the bearing of the roller by means of a spherical joint and on the other side of said bearing by means of an eccentric spherical pin yielding in axial direction and rotatable with respect to the bearing part.

In the annexed drawing—

Figure 1:
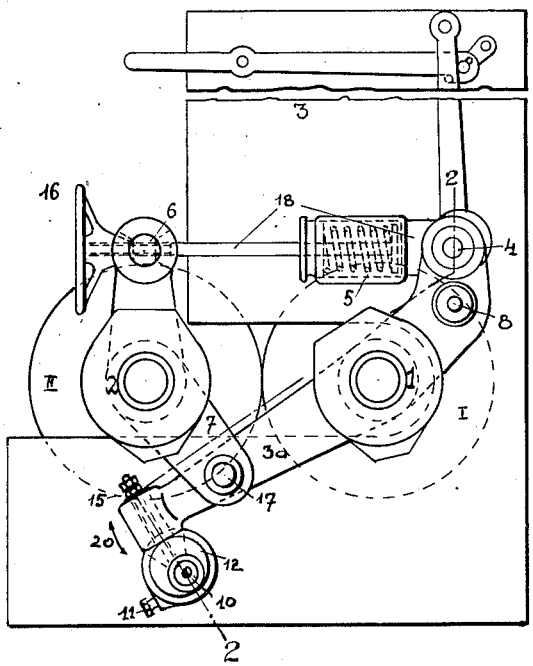
Figure 2:
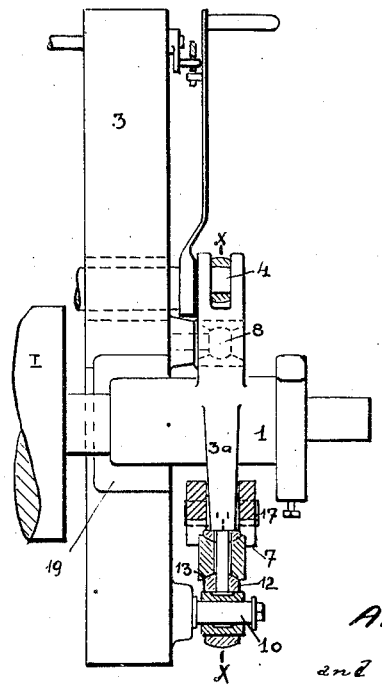

Fig. 1 is a side elevation showing the arrangement of the rollers on the frame of a roller mill and Fig. 2 is a section according to the line 2—2 of Fig. 1.

According to the drawings, I is the fixed roller which, however, is not journalled directly in the frame 3 but on separate arms 3ª which are secured at either side of the bearing 1 of the roller to the frame 3, by means of bolts 8 and 10. The frame is provided with a recess 19 receiving the bearing 1 without coming into direct touch with the frame. The yielding roller II is journalled by means of bearings on the rocking arms 7. 18 is a draw rod for adjusting the mutual distance of the rollers I and II, said rod being connected by pivots 6 to rocking arm 7. The pivot 17 of the rocking arm 7 of roller II and the pivot 4 of the draw rod 18 are not located on the frame 3 but on the arm 3ª, so that these pivots, as well as the pivot 6 connecting the draw rod with lever 7, are symmetrical to a common plane $x$—$x$ (Fig. 2). All forces acting on the pivots lying in this common plane, the frame 3 is relieved from all forces generated by the milling pressure or by the stresses caused by the pressing of the rollers towards each other. The members 7 and 3ª subjected to the said stresses may, owing to their small dimensions and simple shape, be made from a better material, for instance cast steel or forged iron, while the frame itself is ordinary cast-iron.

The bolts 4 and 10 securing the arm 3ª to the frame 3 may be simple bolts. In order, however, to facilitate the exact adaptation of the bearing, the bushes of one roller must be journalled in the bearing boxes by means of spherical surfaces in the manner of spherical joints. It is preferred to use a spherical joint 8, 9 on one side of the bearing 1, allowing the arm 3ª to yield in any direction before its fixing at the other bolt 10. The other end of arm 3ª is journalled by means of a spherical sleeve 12 forming with the concave end 13 of the arm 3ª a spherical joint, which may be fixed by means of a screw 14, 15. The sleeve 12 allows a slight axial shifting on the bolt 10. Preferably this spherical sleeve 12 is journalled eccentrically on the bolt 10. By turning sleeve 12 on bolt 10, arm 3ᵃ may be adjusted in the direction of arrow 20 and may be secured by the screw 11 in the right position.

Having now fully described our said invention and the manner in which it is to be performed, we declare that what we claim is:

1. In a roller mill, the combination of a frame; a fixed roller therein; bearings for said roller disposed at opposite sides of the frame; a pair of separate carrier members for said bearings removably secured to the frame; a yielding roller movable toward and from the fixed roller; and rocking carrier levers for the yielding roller pivoted to said removable carrier members.

2. In a roller mill, the combination of a frame; a fixed roller therein; bearings for said roller disposed at opposite sides of the frame; a pair of separate carrier members for said bearings removably secured to the frame; a yielding roller movable toward and from the fixed roller; rocking carrier levers for the yielding roller pivoted to said removable carrier members; and draw rods for pressing said levers toward the fixed roller likewise pivoted to the removable carrier members.

3. A roller mill, according to claim 1, in which the removable carrier members are secured to the frame at one side of the corresponding bearings by means of spherical joints, and at the other side of said bearings by means of axially-yielding, eccentric journals adapted to be rotated relatively to the carrier members.

4. A roller mill, according to claim 2, in which the rocking carrier levers are pivoted at their lower ends to the removable carrier members; and in which the draw rods are pivotally connected at opposite ends to the upper ends of said levers and removable members.

5. In a roller mill, the combination of a frame; a fixed roller therein; bearings for said roller disposed at opposite sides of the frame; a pair of separate carrier members for said bearings removably secured to the frame at their upper ends by means of spherical joints and at their lower ends by means of axially-yielding, eccentric journals adapted to be rotated relatively to the carrier members; a yielding roller movable toward and from the fixed roller; rocking carrier levers for the yielding roller pivoted to said removable carrier members; and draw rods for pressing said levers toward the fixed roller likewise pivoted to the removable carrier members.

6. In a roller mill a frame, a roller journalled in separate bearing members secured to the frame at one side of the bearing of the roller by means of a spherical joint and at the other side of the bearing of the roller by means of an eccentrically adjustable spherical pin, another roller journalled in rocking members pivotally connected to said bearing members, and adjustable draw members pivotally connected to said bearing and rocking members respectively; the pivots connecting said draw members with the said bearing members and rocking members, and the pivots connecting the said rocking members to the bearing members respectively, being arranged substantially symmetrically to a common plane.

In testimony whereof we affix our signatures.

AUGUST BECKER.
OSKAR STARK.